Figure 3:
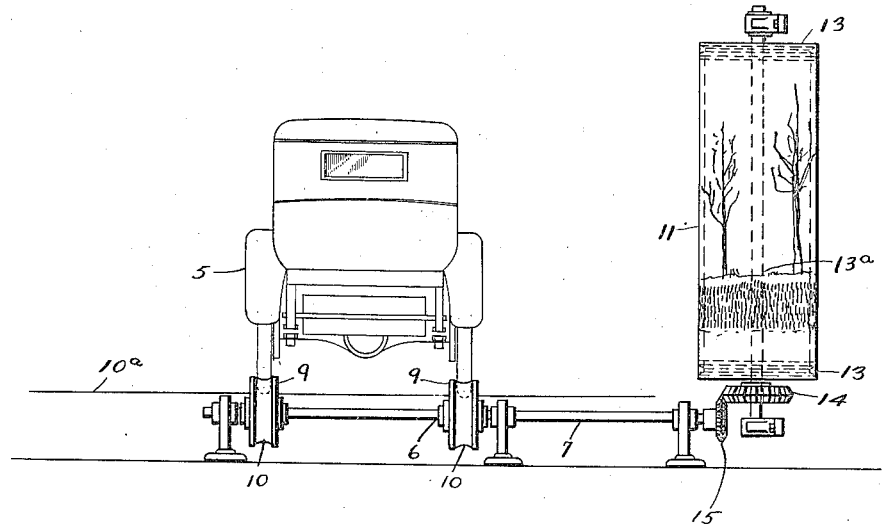

Aug. 5, 1924.
J. H. THEISS
1,504,163
DEVICE FOR INSTRUCTION IN AUTOMOBILE DRIVING
Filed Nov. 4, 1922     2 Sheets-Sheet 1
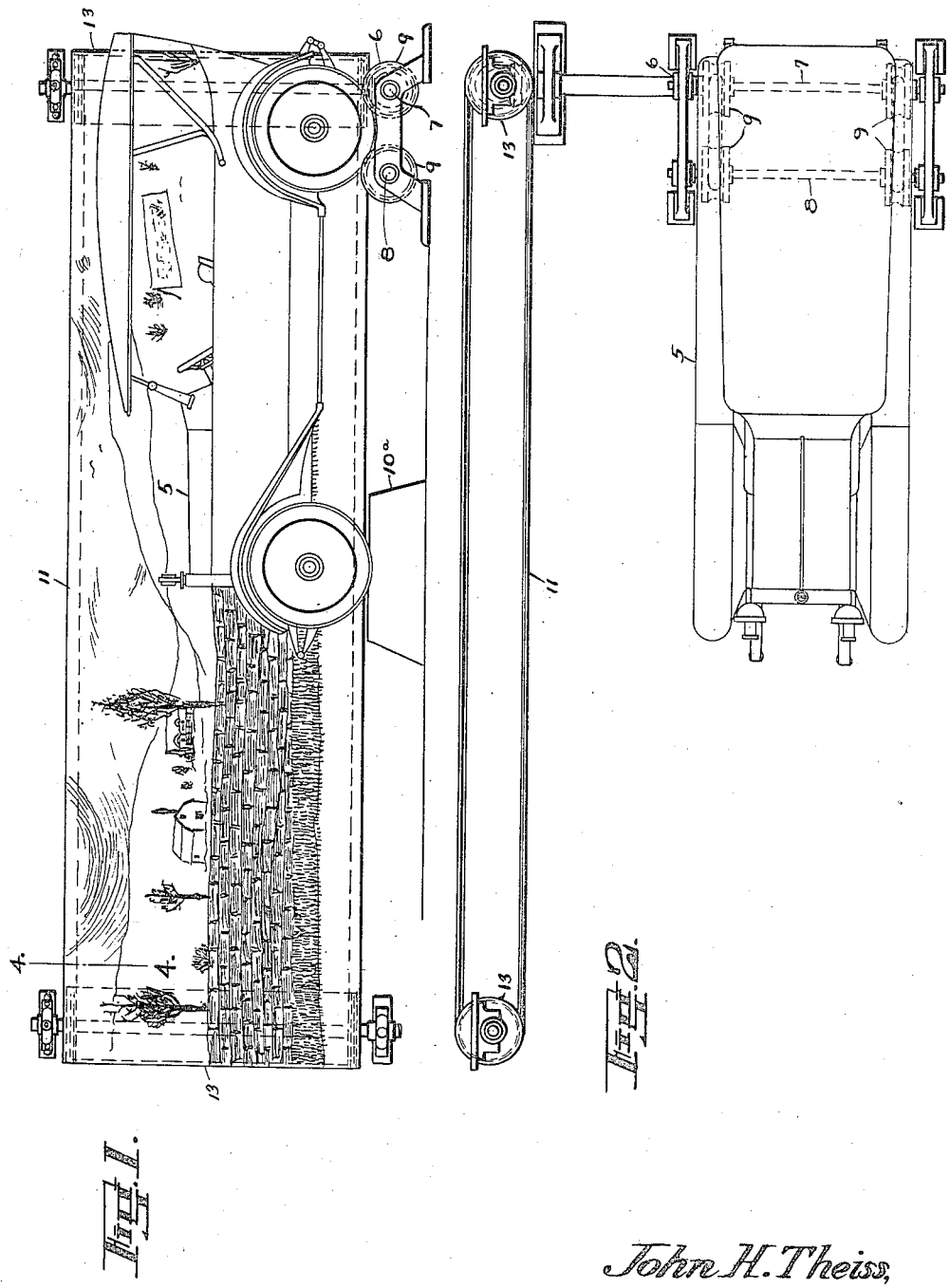

Aug. 5, 1924.

J. H. THEISS 1,504,163

DEVICE FOR INSTRUCTION IN AUTOMOBILE DRIVING

Filed Nov. 4, 1922     2 Sheets-Sheet 2

John H. Theiss, INVENTOR.

BY Victor J. Evans, ATTORNEY.

Patented Aug. 5, 1924.

1,504,163

UNITED STATES PATENT OFFICE.

JOHN H. THEISS, OF PARLIN, NEW JERSEY.

DEVICE FOR INSTRUCTION IN AUTOMOBILE DRIVING.

Application filed November 4, 1922. Serial No. 599,165.

*To all whom it may concern:*

Be it known that I, JOHN H. THEISS, a citizen of the United States of America, residing at Parlin, in the county of Middlesex and State of New Jersey, have invented new and useful Improvements in Devices for Instruction in Automobile Driving, of which the following is a specification.

This invention relates to mechanism for the instruction of automobile driving, and has for its primary object the provision of mechanism of this character for use in teaching one the fundamentals of automobile operation, i. e., starting of motor; motor acceleration; motor throttling; clutch manipulation; gear shifting; control of forward motion of car and back motion thereof.

A further object of the invention is to provide mechanism of this character which will enable one to be satisfactorily and quickly instructed in the art of automobile operation, while eliminating all danger, either to the pupil, pedestrians, or other vehicles.

A still further object of the invention is to provide mechanism of this character wherein the art of operating and running an automobile may be mastered by a pupil without subjecting the pupil to the nervous strain and excitement of road and traffic conditions.

A still further object of the invention is to provide a mechanism which can if desired be interchangeably associated with automobiles of various makes so as to permit an automobile of the pupil's choice to be used in connection with the instruction to be given.

A still further object of my invention is to provide a mechanism of this character having panoramic means for establishing an illusion during the time that the instruction is being given, said means serving to present successive parts or views of the landscape to the eye of the pupil so as to give a natural effect to the eye and thereby serve to further train the pupil to such conditions as occur during the actual operation of an automobile along a highway.

Other advantages of my invention will appear as the following description progresses.

The invention consists substantially in the construction, combination, location and relative arrangement of parts, all as will be more fully hereinafter set forth, as shown by the accompanying drawings, and finally pointed out in the appended claim.

Figure 4:
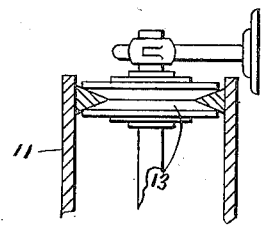

Referring to the drawings:

Figure 1 is a side view of the invention.
Figure 2 is a top view thereof.
Figure 3 is a rear end view of same.
Figure 4 is a section on the line 4—4 of Figure 1.

In the drawings, 5 indicates a motor propelled vehicle of any suitable well-known construction. In carrying the invention into practice, I preferably employ a long narrow room on the floor of which near one end of the room is arranged a fixed combined jack and power transmitting device 6. This device included a pair of idle driven shafts 7 and 8 carrying rolls 9 grooved at 10. The rear driven wheels of the automobile 5 are removably mounted upon the rolls 9 so that the rear of the car is elevated above the floor of the room. In order that the front of the car can be held at a level corresponding with that of the rear of the car, I mount the front wheels upon a suitable platform $10^a$.

Extending in parallel relation to the adjacent side wall of the room in which my improved mechanism is arranged, is an endless panoramic sheet or belt 11 which is painted to provide parts or views of the landscape. This belt is vertically disposed and is arranged immediately at one side of the automobile 5. At one end, the belt passes over grooved idle rollers 13. The shaft $13^a$ of said drive roller is provided with a gear wheel 14 which meshes with a gear wheel 15 on the shaft 7.

From the foregoing description, it will be understood that the belt 11 is long enough so as to extend for a suitable distance in advance of the driver's seat of the automobile 5 and thereby furnish the required illusion of an automobile in actual motion over a highway. The width of the belt 11 is preferably slightly in excess of the height of the automobile. It will of course be understood that the belt may be found of suitable material such as leather, canvas or the like. The inner surface of the belt 11 is provided with V-shaped raised portions 16 which co-act with the grooves of the rollers 12 and 13. This acts to maintain operative driving relation between said belt 11 and the rollers 12 and 13 as will be understood. With the parts arranged as described, it follows that the motor of the automobile can be placed in operation and the various instrumentalities of the automobile actuated in the customary manner. This may be accomplished while the automobile is elevated above the floor of the room referred to. When the motor of the automobile is running, power therefrom is transmitted to the endless panoramic belt 11 so as to set up the illusion of the automobile in actual travel over a highway.

While I have herein fully shown and described and have pointed out in the appended claim, certain novel features of construction, arrangement and operation which characterize my invention, it will be understood by those skilled in the art that various omissions, substitutions, and changes in the forms, proportions, sizes, of the materials used, and of their operation, may be made without departing from the spirit of my invention.

What is claimed as new is:—

An instruction apparatus of the character described comprising a plurality of grooved rollers arranged in pairs, a shaft receiving one roller of each pair whereby rotation of these last mentioned rollers is transmitted to the shaft, a gear keyed to one end of said shaft, spaced parallel vertically disposed shafts mounted for rotation, a gear keyed to one of said vertically disposed shafts and meshing with the gear first mentioned, grooved idle rollers fixed to the ends of said vertically disposed shafts and a panoramic belt trained over the grooved idle roller as and for the purpose specified.

In testimony whereof I have affixed my signature.

JOHN H. THEISS.